May 15, 1962 R. A. LANCASTER 3,034,562
APPARATUS FOR UNCRIMPING FERRULED END
PORTION OF ARTICLES
Filed April 30, 1959 4 Sheets-Sheet 2

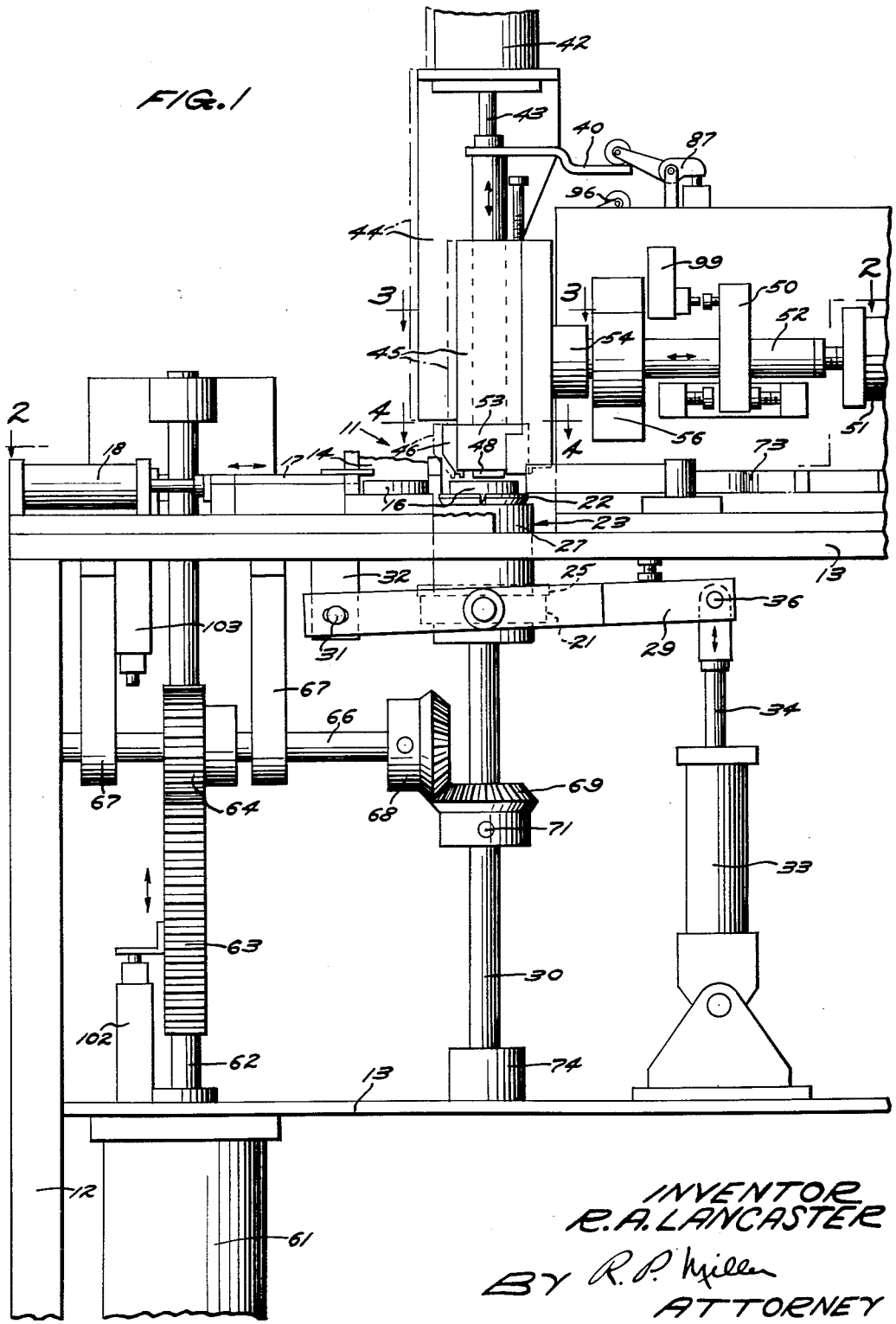

INVENTOR
R. A. LANCASTER
BY R. P. Miller
ATTORNEY

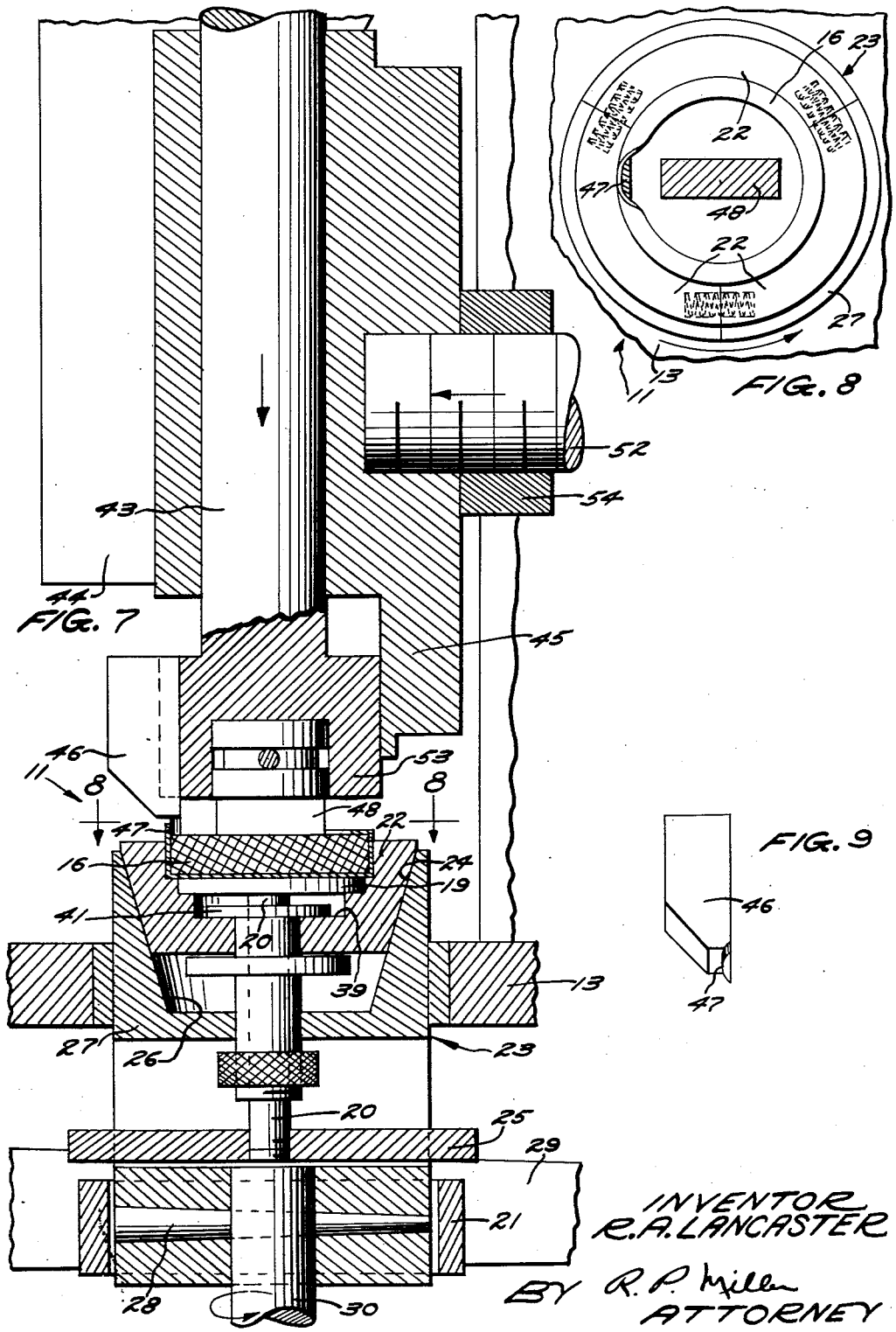

INVENTOR
R. A. LANCASTER
BY R. P. Miller
ATTORNEY

United States Patent Office 3,034,562
Patented May 15, 1962

3,034,562
APPARATUS FOR UNCRIMPING FERRULED
END PORTION OF ARTICLES
Robert A. Lancaster, Indianapolis, Ind., assignor to Western Electric Company, Incorporated, New York, N.Y., a corporation of New York
Filed Apr. 30, 1959, Ser. No. 810,057
2 Claims. (Cl. 153—32)

This invention relates to an apparatus for uncrimping ferruled end portions of articles and more particularly to an apparatus comprising a rotatably mounted article-holding collet to which articles having ferruled end portions are sequentially advanced and an uncrimping tool that is moved relative to the collet whereafter the collet is rotated to accomplish an uncrimping operation.

In the past, devices which have been developed in an attempt to provide a simple, yet automatic, positive-acting uncrimping mechanism have embodied such features as a rotatably mounted tool head having a plurality of tools mounted thereon. The tools have surfaces beveled at varied angles in order that the uncrimping of a ferruled end portion be increased as the head is rotated relative to the article. It is preferable that an uncrimping apparatus of this type be provided with means for advancing a single uncrimping tool into alignment with an article having a crimped or ferruled end portion so that a subsequent lateral movement of the tool relative to the article brings the tool into positive engagement with the crimped portion of the article whereafter a rotation of the article will accomplish a complete uncrimping operation.

It is a prime object of this invention to provide a new and improved apparatus for uncrimping ferruled end portions of articles.

Another object of this invention resides in securing an article within a rotatably mounted collet while simultaneously moving an uncrimping tool into alignment with the article and subsequently, laterally advancing the tool into positive engagement with the crimped portion of the article.

A further object of the invention is to provide automatic means for sequentially advancing articles to a holding collet whereupon facilities are actuated and to simultaneously cause the collet to grip the article and to maintain the article in a stationary position as an uncrimping tool is brought into lateral alignment therewith.

Still another object of the invention resides in rotating a collet having an article positioned therein so that an uncrimping tool which has been advanced into lateral alignment with and has uncrimped a portion of the article lifts the remaining crimped portion of the ferrule from engagement with the article.

An additional object of the invention resides in providing an uncrimping tool having a substantially arcuate-shaped uncrimping surface which compliments the crimped ferrule to preclude the rupture of the ferrule as the tool is brought into positive engagement therewith and as the article is rotated relative thereto to consummate the uncrimping operation.

With these and other objects in view, the present invention contemplates an apparatus for uncrimping ferruled end portions of articles which are successively advanced into an uncrimping station and thereafter gripped and permanently held by a holding collet of the general type shown in the copending application of N. B. Karau and R. Stephens, Serial No. 816,056, filed April 30, 1959. The advance of an article into a seated position within the collet is accomplished by the downward movement of a ram to which is secured a pad and an uncrimping tool having a substantially arcuate-shaped uncrimping surface. As the tool is advanced into lateral alignment with the article, the pad functions to secure the article within the collet. The downward advance of the ram actuates means to initiate lateral movement of the ram thereby bringing the tool into positive engagement with the crimped portion of the article. The movement of the uncrimping tool whereby the engaged ferruled portion of the article is completely uncrimped results in rotation of the gripping collet and the article securely positioned therein relative to the tool to complete the uncrimping operation. Following this, the ram is returned to a former position as the collet is retracted, and another article is advanced to the uncrimping station thereby ejecting the article previously positioned therein.

Other objects and advantages of the present invention will become apparent from the following detailed description when considered in conjunction with the following drawings wherein:

FIG. 1 is a front elevational view of an apparatus for uncrimping ferruled end portions of articles embodying the principles of the present invention;

FIG. 7 is an enlarged fragmentary front view depicting the uncrimping tool and an article holding collet in an operative position;

FIG. 8 is a fragmentary plan view taken along the line 8—8 of Fig. 7,

FIG. 9 is an enlarged perspective view of an uncrimping tool illustrating the substantially arcuate-shaped uncrimping surface of the tool.

Figure 6:
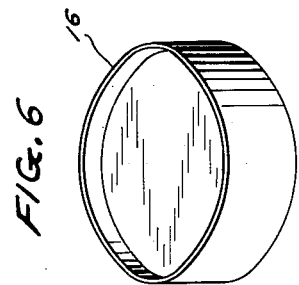
FIG. 6 is a perspective view of an article after the ferruled end portion has been uncrimped.
Figure 5:
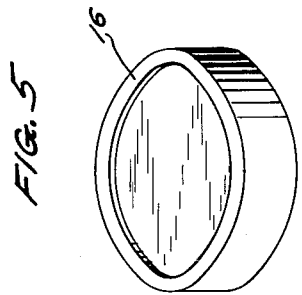
FIG. 5 is a perspective view showing an article having a ferruled end portion.
Figure 2:
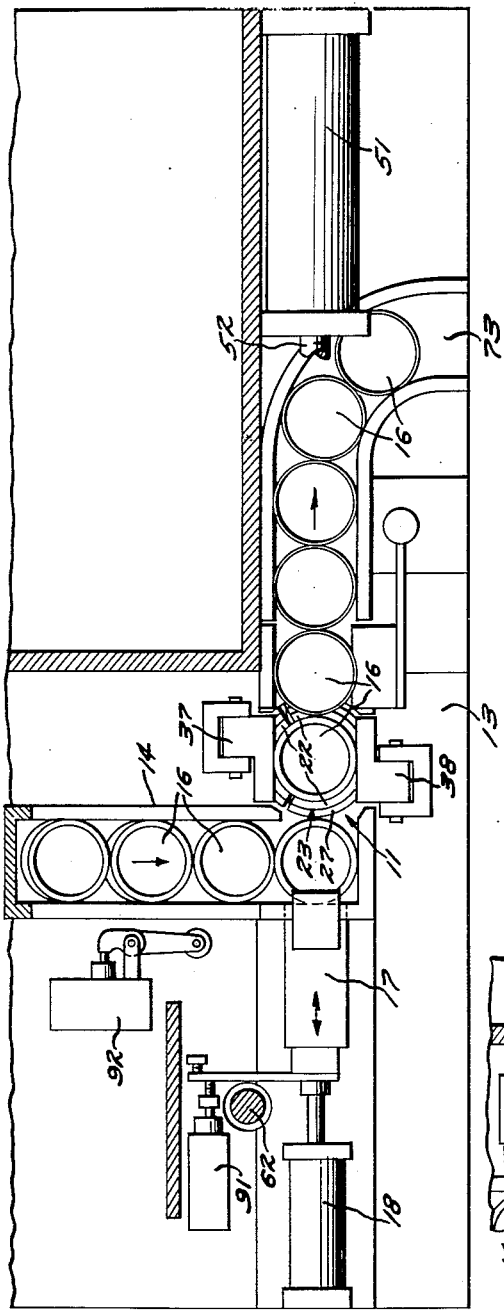
FIG. 2 is a plan view of the same apparatus taken along the line 2—2 of FIG. 1 and illustrating means for successively advancing articles to and seating articles within an uncrimping station.
Figures 3, 4:
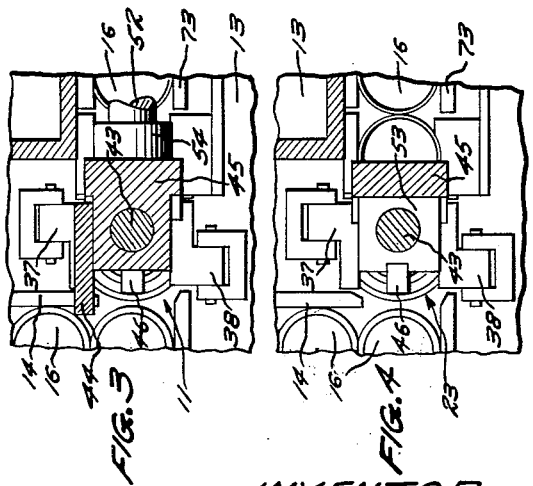
FIG. 3 is an enlarged fragmentary plan view taken along the line 3—3 of FIG. 1.
FIG. 4 is an enlarged fragmentary plan view taken along the line 4—4 of FIG. 1 illustrating the uncrimping tool in positive engagement with an article positioned within the uncrimping station.

Referring to FIG. 1, there is disclosed an uncrimping station generally designated by the numeral 11 that is positioned within a support structure comprising a plurality of legs 12 to which are secured a pair of support plates 13. A gravity chute 14 provides a supply of articles 16 that are successively advanced to the uncrimping station by means of a pusher 17 under the control of an air cylinder 18.

An article 15 that is advanced to the uncrimping station by the pusher is seated on a support disc-plate 19. The disc-plate 19 is secured to a rod 20 which is, in turn, threaded within a movably mounted bar 25. The article 15 when seated upon the disc-plate 19, is positioned in alignment with a plurality of spring-loaded jaws 22 of a holding collet generally designated 23 by a pair of guide plates 37 and 38. The jaws 22 are provided with angularly disposed circumferential surfaces 24 that complement cammed or beveled surfaces 26 of a chuck 27. The chuck 27 is secured by means of a pin 28 to a shaft 30.

A yoke 29 which is pivotally mounted for movement about the pin 31 threaded within a support block 32 is provided with a ring 21 that accomplishes movement of the jaws 22 relative to the chuck 27 by engaging and disengaging the bar 25. The movement of the arm 29 and consequently that of the jaws 22 is transmitted from an air cylinder 33 through a piston rod 34 to which the arm is secured by a pin 36. A positive gripping or engaging action of the article by the collet 23 is accomplished by the simultaneous retraction of the rod 34 within the air cylinder 33 and the downward movement of a ram 43 to which are secured an uncrimping tool 46 and a pad 48. The retraction of the rod within the air cylinder results in the pivotal movement of the arm 29 about the pin 31. The movement of the arm 29 in a downward direction allows the bar 25 to descend due to the depressing force exerted by the ram 43 through the pad 48. More particularly, as the ram descends, the rod 20 to which the support plate is secured has imparted thereto a downward movement resulting in the engagement of the surface 39 of the jaws 22 by a washer 41 that is pinned to the rod. The downward movement of the jaws results in the camming action heretofore described and the positive gripping or seating of the article within the collet.

The uncrimping tool 46 is provided with a substantially arcuate-shaped uncrimping surface 47 (FIG. 9) and is rigidly secured to a housing 53 extending from the base of the ram 43 in which the pad 48 is rotatably mounted. An air cylinder 42 functions to advance the ram 43 in a downward direction through carrier 45. A support plate 44 for the air cylinder 42 is in turn secured to the carrier 45 for movement therewith. The tool 46 is brought into lateral alignment with the crimped ferruled end portion of the piece part 16 when the pad 48 is brought into engagement with the unferruled portion of the article.

An air cylinder 51 that controls the advance of a rod 52 is secured to the carrier 45 through a bushing 54. A guide bracket 56 insures the linear advance of the shaft and the carrier 45 when the air cylinder is rendered effective subsequent to the completion of the downward advance of the ram 43. The linear lateral advance of the carrier 45 simultaneously results in the lateral movement of the ram and the associated structure thereof to bring the pad 48 in line with the center of the unferruled portion of the article. The tool 46 is moved into positive engagement with the crimped portion of the article and uncrimps the engaged portion thereof.

The aforementioned uncrimping operation resulting from the engagement of the article by the tool 46 is followed by a rotation of the collet through 360°. The rotation of the collet and the engaged article seated therein relative to the stationary tool is accomplished by the actuation of an air cylinder 61 and a resulting upward movement of a rod 62 to which is secured a rack 63 that engages and drives a pinion 64. The movement of the rack and pinion arrangement is transmitted through a shaft 66 supported within bushings 67 to a pair of gears 68 and 69. The rotation imparted to the gear 69 which is secured to the shaft 30 by the pin 71 is transmitted to the collet 23 which is secured to the shaft by means of the pin 28.

Subsequent to the complete rotation of the shaft withing a bushing 74 mounted on the lower support plate 13 and the collet secured thereto, the shaft 62 is retracted, thereby transmitting a counter rotation to the collet through the previously described members to return the article to an initial position. Concurrent therewith, the tool under the control of the carrier is returned to an initial position and the air cylinder 33 is actuated to eject the article from its seated position within the collet 23. The air cylinder 18 and the pusher 17 are subsequently rendered effective to eject the uncrimped article into an exit chute 73 while simultaneously feeding another article into the uncrimping station.

Mode of operation

Figure 10:
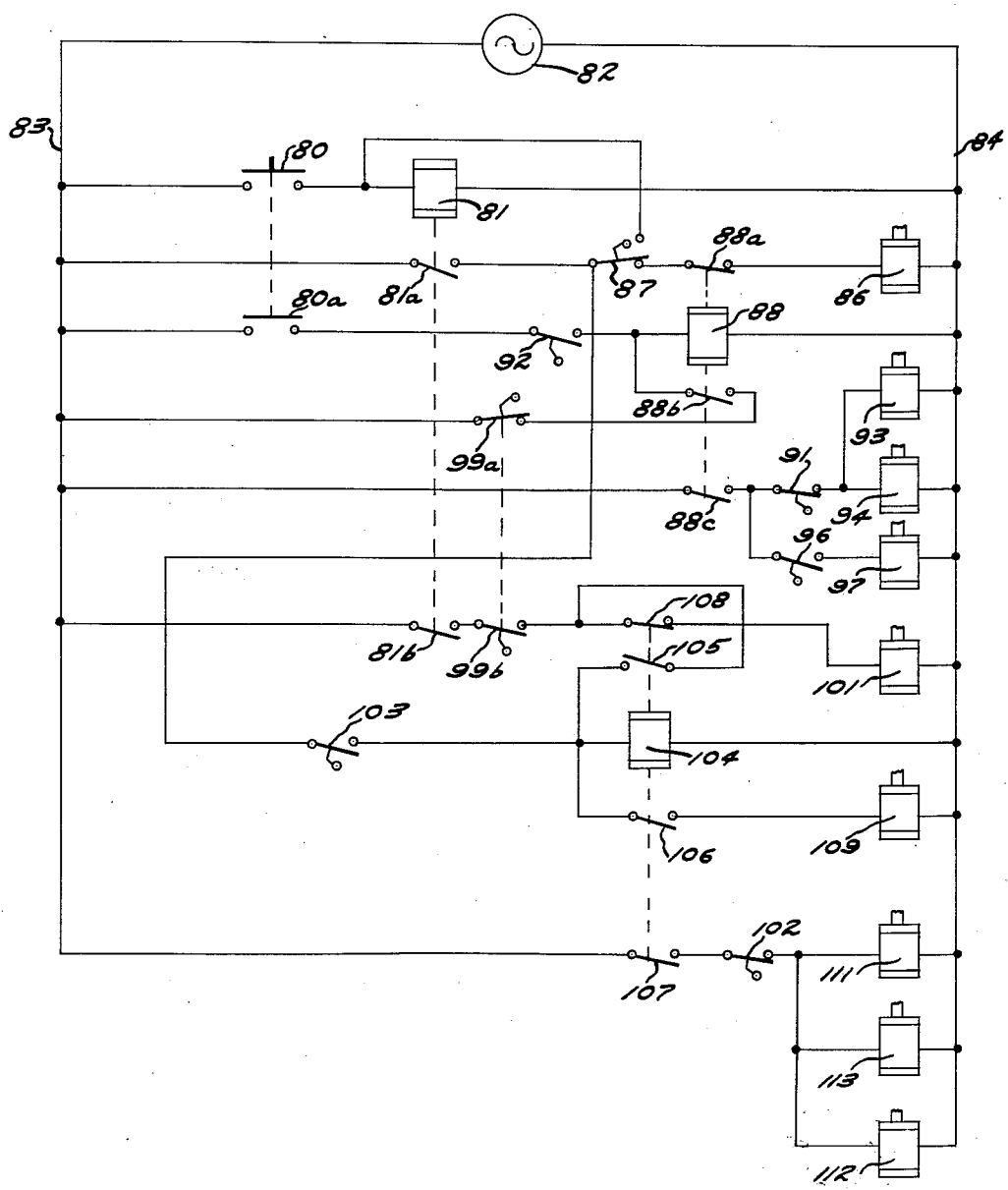
FIG. 10 is a schematic view of the control circuit for operating the apparatus shown in the other figures.

The overall operation of the device may best be appreciated by reference to FIG. 10. The uncrimping apparatus is conditioned for operation by the depression of an auto-cycle on-off switch 80 that results in the closure of contacts 80a. With the auto-cycle switch on, a cycle relay 81 is energized, thereby drawing up contacts 81a and 81b. A path for energizing current may be traced from one side of a source 82, conductor 83, through the on-off switch 80 and the relay 81 to the other side of the source 82, conductor 84.

The closure of contacts 81a provides a path for energizing current for a feed solenoid 86 that may be traced from the conductor 83 through the contacts 81a, the normally closed limit switch 87 and the normally closed contacts 88a of a clamping relay 88 to the solenoid. The energized feed solenoid 86 actuates the air cylinder 18 to advance an article 16 into the uncrimping station while simultaneously advancing an actuating arm 20 projecting from the pusher 17 from engagement with a switch 91 into engagement with a switch 92. The closure of the switch 92 results in the energization of the clamping relay 88 and the drawing up of contacts 88b and 88c and the opening of normally closed contacts 88a. The closure of contacts 88b provides a locking circuit for the clamping relay 88 and the closure of contacts 88c conditions solenoids 93, 94 and 97 for energization. The energization of solenoids 93 and 94 results from the opening of contacts 88a and the deenergization of the feed solenoid 86. The feed solenoid 86, when deenergized, brings the actuating arm 20 into engagement with the switch 91 to complete a path for current to solenoids 93 and 94.

The energized solenoids 93 and 94 simultaneously control the application of air to the cylinders 33 and 42, thereby resulting in the retraction of the rod 34, the movement of the yoke 29 from engagement with the bar 25 and the downward movement of the ram 43 through the carrier 45. The downward movement transmitted to the ram 43 from the cylinder 42 brings the pad 48 into engagement with the article thereby moving the article into a seated position within the collet. As the pad 48 accomplishes the seating of the article 16 within the collet 23, the ram 43 advances the tool 46 into lateral alignment with the ferruled end portion of the article. The downward movement of the ram 42 and the housing 53 in which the pad and tool are mounted under the action of the air cylinder 42 is accompanied by the disengagement of a switch 87 and the closure of the switch 96. The engagement and closure of the switch 96 by an actuating arm 40 projecting from the ram 43 completes a path for energizing current through the previously drawn up contacts 88c to a tool-positioning solenoid 97.

The energized tool-positioning solenoid 97 renders the air cylinder 51 effective to advance the carrier 45 and consequently the support plate 44 and associated ram mechanism in a horizontal plane. The horizontal movement thus imparted is transmitted to the tool 46 and pad 48 to bring the tool into engagement with the ferruled end portion of the article and the pad into vertical alignment with the center of the article. The advance of the tool 46 accomplishes a complete uncrimping of that portion of the article engaged. As a further consequence of the advancement of the rod 52, a projecting member 50 is brought into contact with and results in the closure of a switch 99 thereby opening contacts 99a and drawing up contacts 99b. The opening of contacts 99a results in the deenergization of the relay 88 thereby closing contacts 88a and opening contacts 88b and 88c. The closed contacts 99b complete a path for current to a rotational solenoid 101, thereby energizing this solenoid to actuate the air cylinder 61. The actuation of the air cylinder 61 results in the advance of the shaft 62 and the rack 63 attached thereto to accomplish a rotation of the collet through 360°.

The advance of the rack and the projecting member 69 further accomplishes the disengagement and opening of a switch 102 and the closure of a limit switch 103. Closure of the limit switch 103 provides a path for energizing current to a relay 104, thereby drawing up contacts 105, 106 and 107 and opening normally closed contacts 108. The opening of contacts 108 results in the deenergization of the rotational solenoid 101. Drawn-up contacts 106 complete a path for current to a second rotational solenoid 109 previously conditioned for operation by the closure of limit switch 103. The rotational solenoid 109 functions to retract the shaft 62 and through the cooperation of the previously described rotational mechanism return the collet with the article secured therein to an initial position.

The retraction of the rack in addition to returning the collet to a former position removes the projecting member 60 from contact with the limit switch 103 and moves the member into engagement with the limit switch 102. The closure of the limit switch 102 results in the energization of a tool-repositioning solenoid 111, a clamp-release solenoid 112 and solenoid 113. The energization of solenoid 111 results in the retraction of the shaft 52 and the carrier 45 and removes the tool from engagement with the article; consequently, the limit switch 99 is opened and the relay 104 is again deenergized, thereby opening contacts 105, 106 and 107. The opening of contacts 107 results in the deenergization of solenoids 111, 112 and 113.

The solenoid 112 while momentarily energized rendered the air cylinder 33 effective to advance the yoke and move the article out of a seated position within the collet 23 as the pad and tool secured to the housing 53 at the base of ram 43 were removed from engagement with the article. The retraction of the ram is accomplished by the momentary energization of the solenoid 113 and the actuation of the cylinder 42. The upward movement of the ram further accomplishes a reengagement of the limit switch 87 to condition the uncrimping device for another cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a machine for automatically uncrimping a cylindrical container having one edge of its cylindrical wall crimped over one end wall thereof, a container seating fixture, an uncrimping tool having a generally cylindrical surface for engaging and uncrimping said crimped edge, means supporting said fixture and said tool for movement relative to each other with the axis of said generally cylindrical tool surface maintained parallel to the axis of said cylindrical container, means for causing relative movement of said tool axially of the container to bring the free end of said tool substantially against the one end wall thereof, means for causing relative movement of said tool tool generally radially of the container to bring said generally cylindrical tool surface against said crimped edge and to straighten the engaged portion thereof, and means for causing relative rotation of said tool and said container about the axis of said container while said axes of said tool surface and said container are maintained substantially parallel to each other to effect further uncrimping of said crimped edge.

2. An apparatus for uncrimping ferruled end portions of articles which comprises a support structure, a ram movably mounted on said support structure; an uncrimping tool mounted on said ram for movement therewith and movement relative thereto and having a substantially arcuate uncrimping surface, said uncrimping tool being mounted on said ram so that the axis of said arcuate surface is maintained parallel to the longitudinal axis of said ram; a pad secured to said ram for movement therewith; an article-holding collet rotatably mounted within said support structure; means for advancing an article having a ferruled end portion into said collet; means actuated by said article-advancing means for driving said ram to move said uncrimping tool and said pad into engagement with a portion of the article, said pad serving to positively hold said article within said collet; means rendered effective by said ram-driving means for advancing the tool relative to said article to move the arcuate uncrimping surface thereof into engagement with the ferruled end portion of said article; and means rendered operable by said tool-advancing means for rotating said collet relative to said uncrimping tool to complete an uncrimping operation on said article.

References Cited in the file of this patent
UNITED STATES PATENTS

| | | |
|---|---|---|
| 1,276,267 | Rasmussen et al. | Aug. 20, 1918 |
| 2,028,202 | Gauthier | Jan. 21, 1936 |
| 2,424,591 | Stephens | July 29, 1947 |
| 2,660,930 | De Vlieg et al. | Dec. 1, 1953 |